(12) United States Patent
Damiba et al.

(10) Patent No.: US 7,660,719 B1
(45) Date of Patent: Feb. 9, 2010

(54) CONFIGURABLE INFORMATION COLLECTION SYSTEM, METHOD AND COMPUTER PROGRAM PRODUCT UTILIZING SPEECH RECOGNITION

(75) Inventors: Bertrand A. Damiba, San Francisco, CA (US); Rohit Dhawan, San Francisco, CA (US); Navneet Raja, Ranchi (IN); Anthony Rajakumar, Foster City, CA (US); Vipul Niranjan Vyas, Mountain View, CA (US)

(73) Assignee: Bevocal LLC, Sunnyvale, CA (US)

( * ) Notice: Subject to any disclaimer, the term of this patent is extended or adjusted under 35 U.S.C. 154(b) by 710 days.

(21) Appl. No.: 10/922,433

(22) Filed: Aug. 19, 2004

(51) Int. Cl.
*G10L 15/00* (2006.01)
(52) U.S. Cl. ............................. 704/275; 704/270
(58) Field of Classification Search ............... 704/270, 704/275
See application file for complete search history.

(56) References Cited

U.S. PATENT DOCUMENTS

| | | | |
|---|---|---|---|
| 6,714,642 B2 | 3/2004 | Dhir et al. | 379/265.02 |
| 2002/0059073 A1* | 5/2002 | Zondervan et al. | 704/270.1 |
| 2002/0076030 A1 | 6/2002 | Statham et al. | 379/229 |
| 2002/0188451 A1* | 12/2002 | Guerra et al. | 704/270 |
| 2003/0039948 A1* | 2/2003 | Donahue | 434/322 |
| 2003/0055800 A1 | 3/2003 | Geoghegan | 706/45 |
| 2003/0197607 A1 | 10/2003 | Striemer | 340/539.1 |
| 2003/0220796 A1* | 11/2003 | Aoyama et al. | 704/275 |
| 2004/0010720 A1 | 1/2004 | Singh et al. | 713/201 |
| 2004/0138891 A1* | 7/2004 | Vora | 704/270.1 |
| 2005/0027536 A1* | 2/2005 | Matos et al. | 704/270.1 |
| 2005/0060175 A1* | 3/2005 | Farber et al. | 705/1 |
| 2005/0091057 A1* | 4/2005 | Phillips et al. | 704/270.1 |
| 2005/0149331 A1* | 7/2005 | Ehrlich | 704/270.1 |
| 2005/0171781 A1* | 8/2005 | Poploskie | 704/270.1 |
| 2005/0261907 A1* | 11/2005 | Smolenski et al. | 704/270 |
| 2007/0219803 A1* | 9/2007 | Chiu et al. | 704/270.1 |
| 2008/0040112 A1* | 2/2008 | Barash | 704/246 |

FOREIGN PATENT DOCUMENTS

| | | |
|---|---|---|
| WO | WO00/70584 | 11/2000 |
| WO | WO02/071390 | 9/2002 |
| WO | WO2004/034355 | 4/2004 |

\* cited by examiner

*Primary Examiner*—Daniel D Abebe (57) ABSTRACT

A system, method and computer program product are provided for collecting information utilizing speech recognition. After receiving a specification, a voice application is configured based on the specification. During use, the voice application is capable of collecting information utilizing speech recognition.

3 Claims, 5 Drawing Sheets

CONFIGURABLE INFORMATION COLLECTION SYSTEM, METHOD AND COMPUTER PROGRAM PRODUCT UTILIZING SPEECH RECOGNITION

FIELD OF THE INVENTION

The present invention relates to speech recognition, and more particularly to collecting information using speech recognition.

BACKGROUND OF THE INVENTION

It is increasingly common that consumers seek service from business concerns using the telephone. For example, a consumer seeking to place an order, schedule a delivery, file a complaint, or query an account balance may place a call to a centralized number provided by a business concern. It is well known that businesses often provide such numbers as so-called toll-free "800" numbers or the like.

Such toll free sites may be staffed by a series of agents who have been trained in customer service. While most agents will have generalized training and knowledge in dealing with customers, they typically have different levels of experience and training with regards to particular skill sets. For example, certain agents will have extensive experience with one type of product or transaction, while other agents will have experience with different products or transactions. Thus, agents may have different skill sets. Two agents may have familiarity with a given product or transaction, but may have a different level of skill for the given item. Thus, agents may have different skill levels for a given skill set.

Additionally, certain agents may have specialized skill sets not readily adapted to training, but still very important to certain customers. For example, some agents may have fluency in certain languages, such as Spanish or French.

Some toll free sites are so-called "virtual call centers," whereby calls are routed to agents at call centers at different geographic locations. One problem with this approach involves the employment of properly qualified agents. Moreover, it is often very time consuming to screen a large number of potential agents in search of the appropriate qualifications, including knowledge of various technical information as well as fluency in predetermined languages.

Today, such screening is often performed manually using live employment specialists or via web-based questionnaires, etc. Unfortunately, the use of live employment specialists for such screening is cumbersome and expensive. Moreover, web-based questionnaires are unable to screen for fluency in various languages, etc.

Of course, the foregoing problems stem from not only virtual call center employment programs, but also in various other information gathering contexts (i.e. a test, a survey, an interview, a resume, etc.).

SUMMARY OF THE INVENTION

A system, method and computer program product are provided for collecting information utilizing speech recognition. After receiving a specification, a voice application is configured based on the specification. During use, the voice application is capable of collecting information utilizing speech recognition.

In one embodiment, the information may be collected utilizing a test, a survey, an interview, a resume, and/or a game. Moreover, the specification may include a mark-up language format (i.e. XML, etc.).

In another embodiment, the specification may include a plurality of multiple choice questions. Thus, the voice application may be capable of collecting information including answers to the multiple choice questions, utilizing speech recognition. As an option, the multiple choice questions may differ based on a log-in process involving the user. For example, the multiple choice questions may differ based on a gender, age, etc. of the user.

In still another embodiment, the voice application may be adapted for collecting information including confidence scores associated with answers to language queries, utilizing speech recognition. By this technique, a proficiency in a particular language may be tested.

To this end, the voice application may be adapted for providing an automated grade based on the answers to the multiple choice questions, the confidence scores, and an associated threshold.

In still yet another embodiment, the specification may include a plurality of open-ended questions. Thus, the voice application may be adapted for collecting information including recorded speech content received in response to the open-ended questions, utilizing speech recognition.

Optionally, the voice application may be tested prior to being utilized. Further, the voice application may be calibrated based on the testing. In one embodiment, the voice application may be tested by collecting information utilizing the voice application. As mentioned previously, such information may include answers to multiple choice questions, confidence scores associated with answers to language queries, and recorded speech content received in response to open-ended questions. As an option, the voice application may be calibrated by manually setting at least one threshold for the confidence scores, etc.

In use, the voice application may generate a database with a plurality of fields that are capable of being processed by a user. Such processing may include searching, sorting, categorizing, and/or evaluating.

Further, the voice application may be capable of being configured for different purposes by utilizing different specifications.

In another embodiment, a computer-implemented method is provided for administering a test utilizing speech recognition. In use, a file associated with a test is accessed. Utilizing such file, the test is administered over a phone. Results of the test are then received for scoring, grading, etc.

As an option, the file may include an XML file. Further, the XML file may be converted to a VoiceXML file upon being accessed. Of course, the file may optionally be edited for tailoring the testing situation.

To this end, the results may be graded, and the graded results may be used to generate a scoring report. Optionally, the results may be graded according to a logic specified by the XML file. Further, the scoring report may be specified by the XML file.

DETAILED DESCRIPTION

Figure 1:
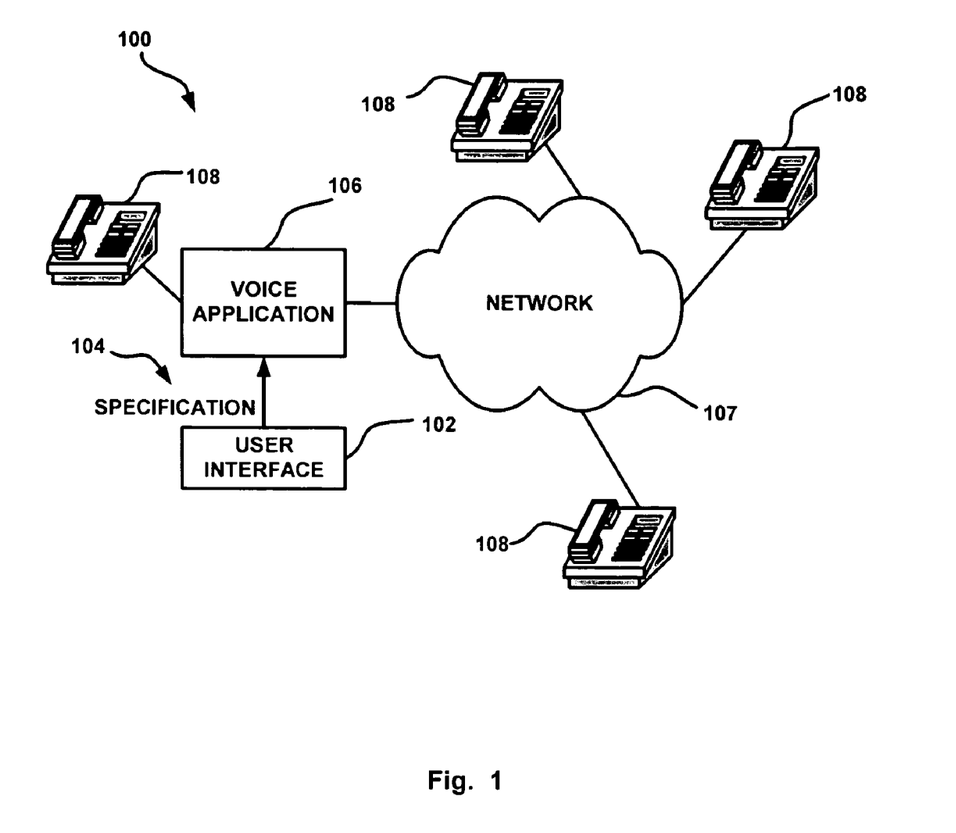
FIG. 1 illustrates an exemplary architecture, in accordance with one embodiment.

FIG. 1 illustrates an exemplary architecture 100, in accordance with one embodiment. As shown, a network 107 is provided. In the context of the present architecture 100, the network 107 may take any form including, but not limited to a local area network (LAN), a wide area network (WAN) such as the Internet, a telecommunications network, etc.

As shown, the network 107 interconnects a plurality of telephones 108. It should be noted that, in the context of the present description, such telephones 108 may take the form of stationary, mobile, analog and/or digital communication devices capable of communicating voice communications. Moreover, such telephones 108 may be dispersed locally and/or at a global scale.

With continuing reference to FIG. 1, a voice application 106 is provided for collecting information utilizing speech recognition. In the context of the present description, the voice application 106 may include any software, hardware, logic, and/or combination thereof capable of collecting information utilizing speech recognition. Moreover, the information may be collected utilizing a test, a survey, an interview, a resume, a game, and/or any other desired technique of collecting information utilizing speech recognition.

The voice application 106 is capable of being configured based on a specification 104 that is generated utilizing a user interface 102 or some other suitable mechanism. To this end, during use, the voice application 106 is capable of collecting information utilizing speech recognition in a manner that is suited for a particular desired purpose.

More exemplary information will now be set forth regarding various hardware and software functionality options associated with the foregoing architecture.

Figure 2:
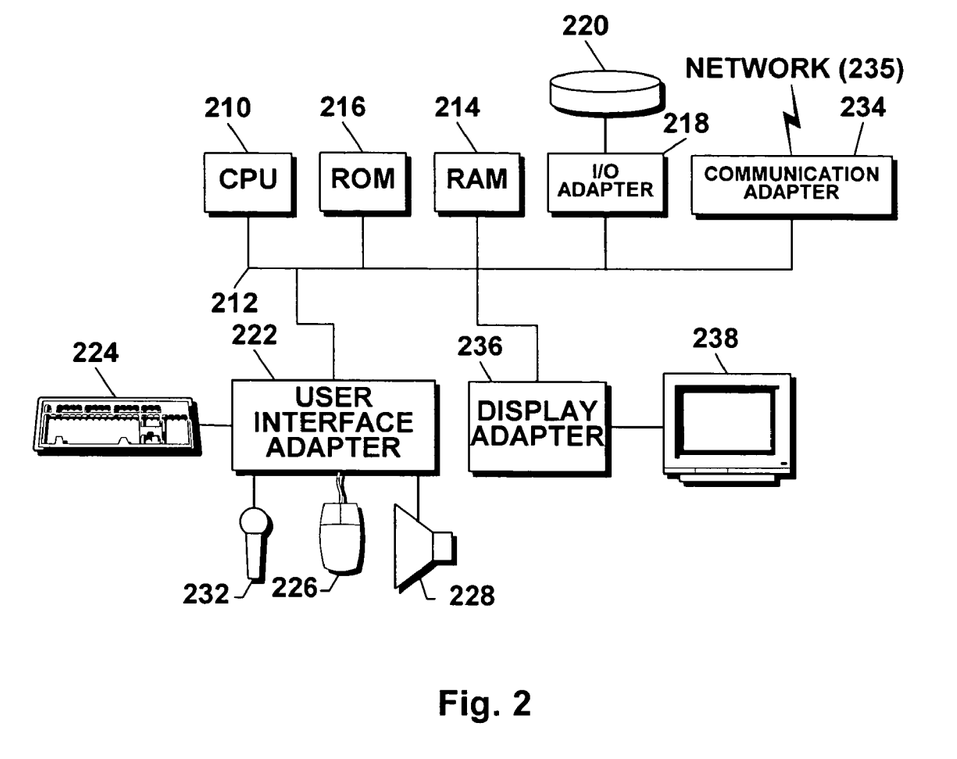
FIG. 2 shows a representative hardware environment on which the voice application, user interface, and/or even the telephones of FIG. 1 may be implemented, in accordance with one embodiment.

FIG. 2 shows a representative hardware environment on which the voice application 106, user interface 102, and/or even the telephones 108 of FIG. 1 may be implemented, in accordance with one embodiment. Such figure illustrates an exemplary hardware configuration of a workstation in accordance with one embodiment having a central processing unit 210, such as a microprocessor, and a number of other units interconnected via a system bus 212. Of course, the various components of FIG. 1 may be implemented in any desired hardware environment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows Operating System (OS), the IBM OS/2 operating system, the MAC OS, or UNIX operating system. It will be appreciated that a preferred embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
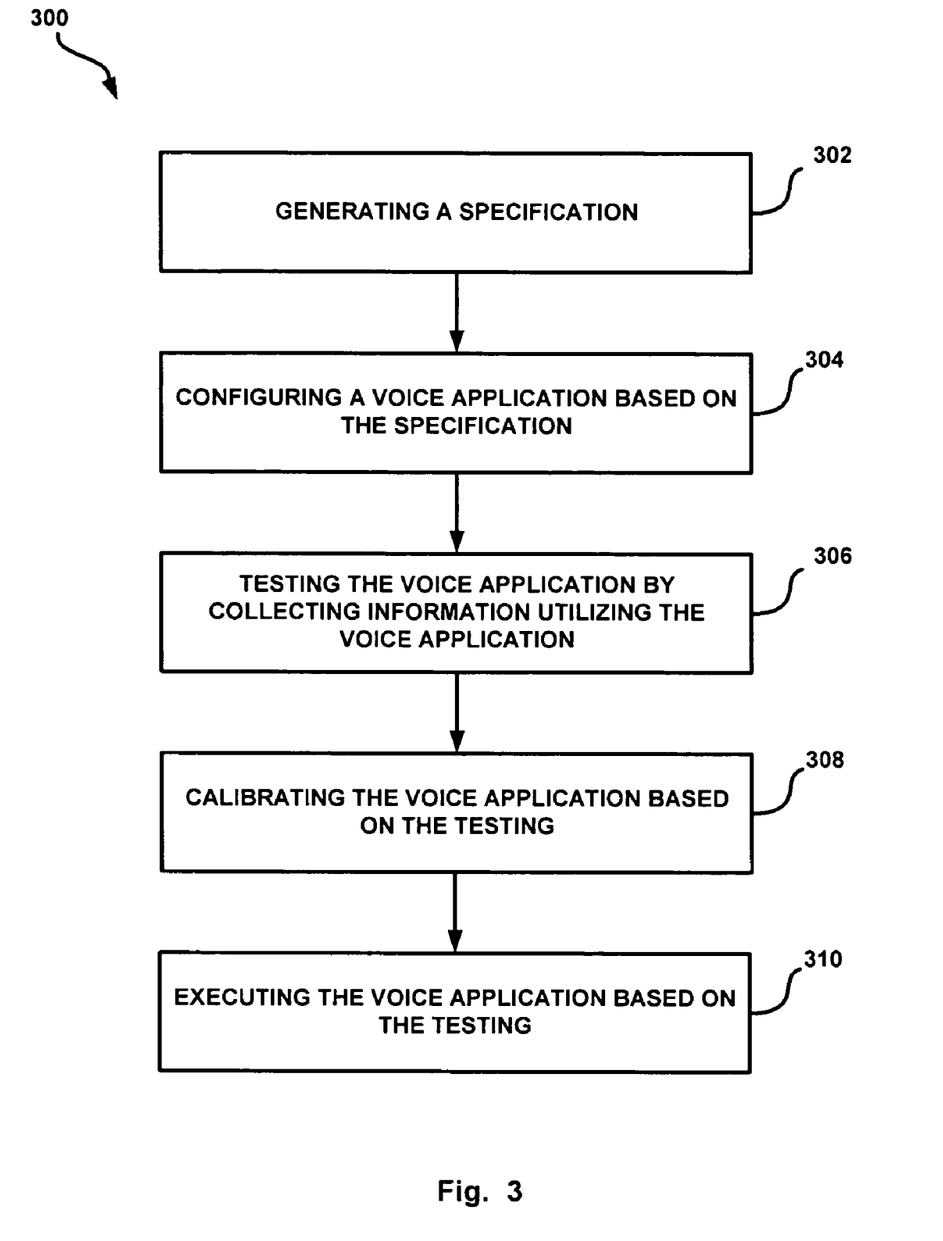
FIG. 3 illustrates a method for collecting information utilizing speech recognition, in accordance with one embodiment.

FIG. 3 illustrates a method 300 for collecting information utilizing speech recognition, in accordance with one embodiment. As an option, the present method 300 may be implemented in the context of the architecture of FIGS. 1 and 2. Of course, the method 300 may be implemented in any desired context.

As shown, in operation 302, a specification is generated (see, for example, the specification 104 of FIG. 1). Such specification may include a mark-up language format (i.e. XML, etc.), or any other desired format. Moreover, the specification may be generated utilizing a user interface (see, for example, the user interface 102 of FIG. 1).

In use, the specification is capable of configuring a voice application (see, for example, the application 106 of FIG. 1) to collect information utilizing speech recognition for different purposes. To accomplish this, the specification may, in one embodiment, include a plurality of multiple choice questions, a plurality of language queries, a plurality of open-ended questions and/or any other desired configurable information collection techniques, for reasons that will soon be set forth.

Still yet, grading logic may be defined to provide an algorithm that translates the collected information into a standardized "grade" or performance indicator. Even still, a desired field-by-field output of the collected information may be defined by the specification. Of course, other aspects such as the specific language to be used, a required time per question, an available option to repeat question answers, grammars to use, prompts to play, timeouts, etc. may also be defined by the specification.

Once the specification is generated and received by the voice application as set forth in operation 302, the voice application is configured based on the specification. Note operation 304. This may be accomplished by configuring the voice application to be able to perform the information collection techniques.

For example, the voice application may include numerous variables representing questions, answers to the questions, grading logic, the various features mentioned previously, etc.; and the specification may provide particular values, content, logic, etc. to fill the place of such variables. Thus, the features common among all of the uniquely-purposed applications are maintained in the voice application along with variables representing features that may change. To this end, the specification may be used to fill the variables.

It should be further noted that the specification used to configure the voice application may be selected from many different specifications based on a desired algorithm to prevent fraud/memorization of tests by callers. Just by way of example, a caller that is retaking a test may be given a test with content that is different from that of a previous test administered to such user. To accomplish this in an effective manner, the specification may be chosen "on the fly." This thus allows, for example, callers to have unique tests or unique games, etc.

In one embodiment, the voice application may include a pre-written skeleton application that can be written in any language and can be configured by an XML document, etc. The voice application can, in one embodiment, be construed to be any voice application that can be configured by an XML document (i.e. the voiceXML itself, etc.) or any other type of specification. As an option, the voice application may be preconfigured, with prompts and grammars included for logging in the caller, and logic to configure itself according to the configuration specification.

Next, in operation 306, the voice application may be tested by collecting information utilizing the voice application, based on the configured information collection techniques. For example, the information may include answers to the multiple choice questions, confidence scores associated with answers to the language queries, and recorded speech content received in response to the open-ended questions.

As an option, the multiple choice questions may differ based on a log-in process involving the user, per the specification. For example, the multiple choice questions may differ based on a gender, age, company, random algorithm, geographic area (i.e. identified by a caller identifier), etc. of the user.

Specifically, the multiple choice answers may include a verbal answer for each question that is converted into a corresponding data answer utilizing speech recognition. Further, the confidence scores associated with the answers to the language queries may be elicited by a request for the user to repeat an utterance (i.e. word, phrase, etc.). Such utterance is then recorded and recognized for comparison to a pre-recorded grammar of the word, phrase, etc. The closer the recognized utterance matches the grammar, the higher the confidence score. Still yet, the recorded speech content may include an open dialogue including multiple strings of utterances received in response to an open-ended question, for being audibly reviewed in a manual manner at a later time, if desired.

Based on this testing, the voice application is calibrated in operation 308. One method by which this may be accomplished includes manually setting at least one threshold for the confidence scores. In other words, an administrator may review the confidence scores and the actual utterances, and then set the minimum confidence score for an utterance to "pass" the language queries. Of course, numerous multi-tiered thresholds may optionally be selected to provide more grade granularity.

To this end, in operation 310, the calibrated voice application is capable of being executed for collecting information utilizing speech recognition. Still yet, the voice application may provide a grade based on at least one threshold (taking into account the confidence scores), and the answers to the multiple choice questions. Still yet, administrators may review the open dialogue for conducting more subjective analysis. Of course, provided that the user has access to a visual interface, information may further be collected using textual input, etc.

As a further option, the aforementioned calibration can be recalibrated so as to "rescore" the test results. In other words, operation 308 may be repeated after operation 310, thus providing new scoring results.

In order to accommodate intentional or unintentional pauses or breaks in the information collection process (i.e. accidental hang-up, speech recognition application failure or slowdown, etc.), a state of interaction with the user may be stored during the receipt of the information. Such state may include the identity of the user as well as stored information already collected via the speech recognition process. Thus, the receipt of information may be capable of being interrupted, and subsequently continued based on the state of interaction. This may be accomplished by the user simply calling the application again and providing their identity.

As an option, the information may be collected via a live agent instead of and/or in addition to utilizing the speech recognition. For example, the speech recognition process may be ceased and the live agent connected to the user, upon predetermined criteria being met. For example, such predetermined criteria may be met upon a difficulty arising with the receipt of the information utilizing the automated speech recognition. Of course, such difficulty may arise from either problems with the speech recognition application or the user.

Live agents may further be used to enhance the user experience, even if they are not available in real (or near real)-time. For example, a dialog of the user may be stored during the receipt of the information. Thus, a live agent may manually transcribe the dialog after the receipt of the information utilizing the automated speech recognition. Since some information collected from the user may be mandatory while other information is unnecessary, the present feature may be employed for unnecessary information, so that mandatory information collection may proceed without delay.

After information is collected, the voice application may further generate a database with a plurality of fields that are capable of being processed by a user. Such processing may include searching, sorting, categorizing, and evaluating. For example, the database may be searched based on when the information collection has taken place, the identity of the user, and response content.

The present voice application may thus be capable of being configured for different purposes by utilizing different specifications. Such purposes may be employment purposes (predicting performance of a potential and/or existing employee), in a call center context, and/or any other purpose that requires information collection in an automated manner.

Figure 4A:
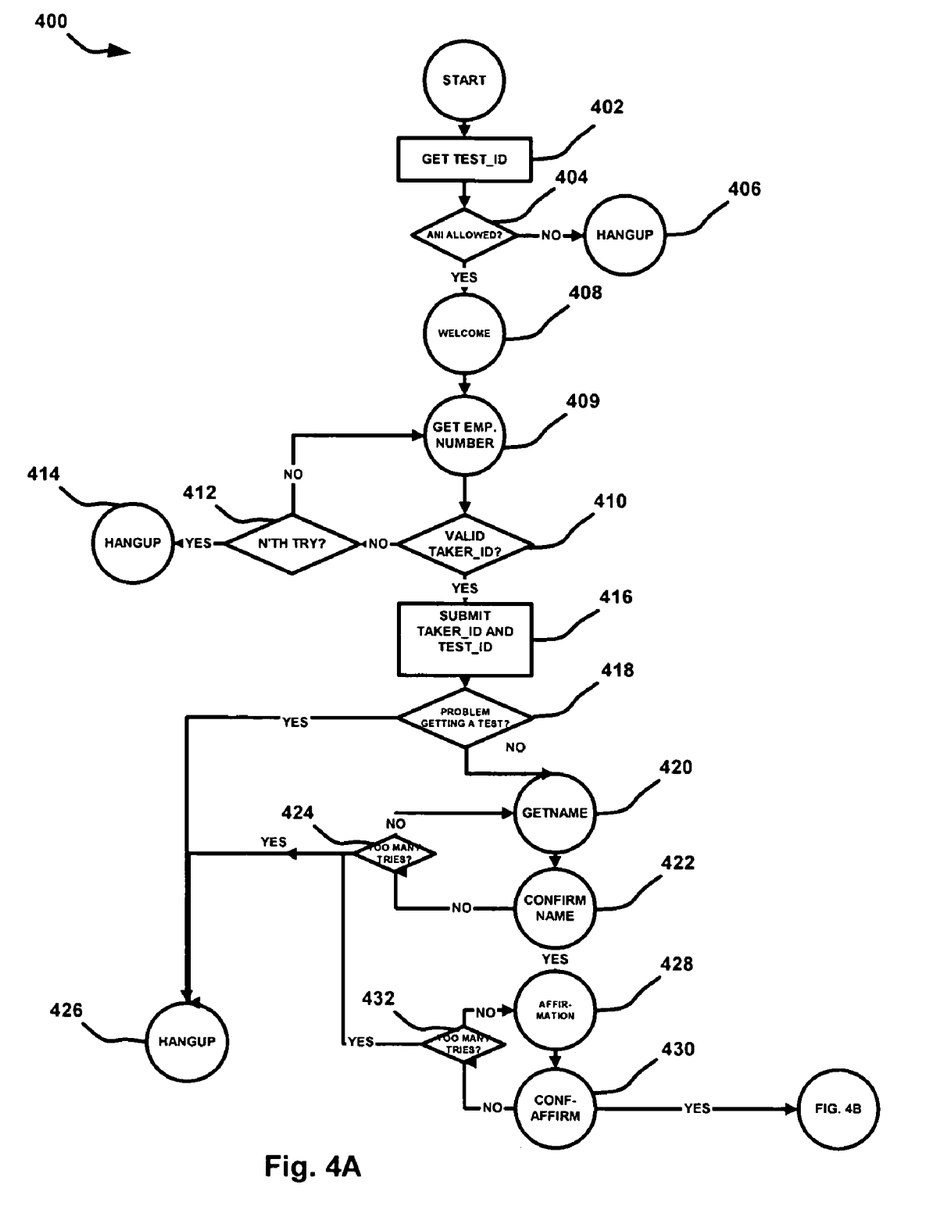
FIGS. 4A-4B illustrate an exemplary method for eliciting information from a user, in accordance with one embodiment involving an employee (or potential employee) test.
Figure 4B:
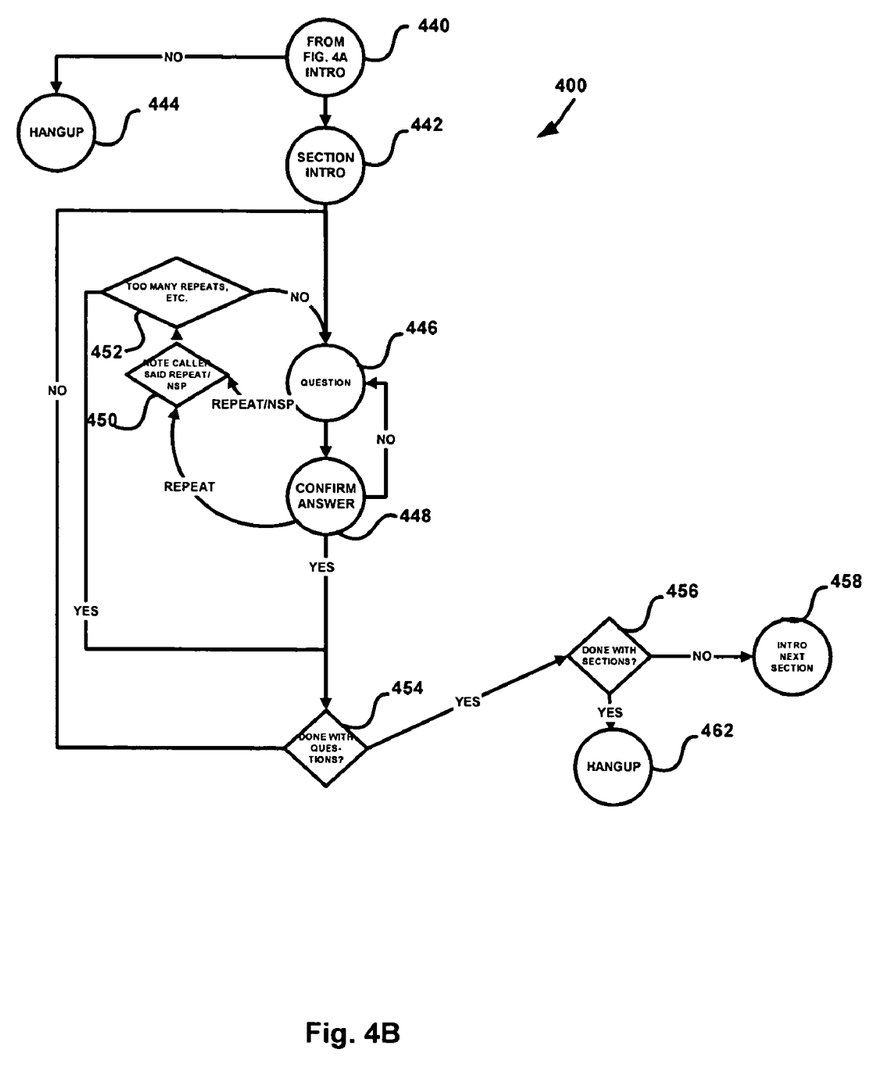

FIGS. 4A-4B illustrate an exemplary method 400 for eliciting information from the user, in accordance with one embodiment. As an option, the present method 400 may be implemented in the context of the architecture of FIGS. 1 and 2. Still yet, the exemplary method 400 may be implemented in the context of operation 310 of FIG. 3 (or even operation 306 during testing of the voice application). Of course, the method 400 may be implemented in any desired context.

The present exemplary method 400 is set forth in the specific context of a test for a potential employee. As noted above, the present technology is not limited to such a specific context, and the following description is provided for illustrative purposes only and should not be construed as limiting in any manner.

With reference first to FIG. 4A, upon execution and receipt of a call from a user, an appropriate test is identified by the voice application. Note operation 402. As set forth earlier, such test may be generated using a predefined specification.

Before the user is allowed to continue, it is determined whether an automatic number identifier (ANI) is permitted in decision 404. For example, calls may be limited to certain numbers for various reasons. If the ANI is not allowed, a dialog shown in Table 1 may be verbally communicated and the call may be terminated in operation 406.

TABLE 1

"Thanks for calling the Company Agent Qualification Line. Sorry, you can't take this test when calling from this phone number. Contact your team leader for details. Thanks again, and goodbye."

If the ANI is allowed in decision 404, the caller is welcomed in operation 408 and an employee (or prospective employee) identifier is requested in operation 409. This may be accomplished, for example, using the dialog shown in Table 2, in order to attempt to elicit the identifier verbally, at first, and then request that the identifier be entered using a phone keypad.

TABLE 2

{On first-time entry} "Please key in your employee id"
<2 sec pause> "Use the telephone key pad and punch in your employee id. If you don't have it, ask your team leader. Please key in your employee id now."
{Otherwise} "Sorry, but I couldn't find that employee id on my list. Please key in your employee id again."

As an option, the employee (or prospective employee) identifier may be confirmed. The method 400 continues by determining whether the identifier is valid in operation 410. If not, operation 409 is repeated for a predetermined number of repetitions, per decision 412. If operation 409 is repeated beyond such threshold, the call is terminated in operation 414.

If, however, it is determined that the identifier is valid in operation 410, the test identified in operation 402 and the employee identifier are submitted. Thus, the voice application may retrieve and prepare to administer the appropriate test identified in operation 402. See operation 416. If there is a problem retrieving or preparing the test, as determined in decision 418, the call is terminated in operation 426.

If there is no problem, however, the user is prompted to provide an utterance corresponding to their name. Note operation 420. Thereafter, the user is requested to confirm the name in operation 422. If there is no confirmation, operation 420 may be repeated for a predetermined number of repetitions, based on decision 424. If such predetermined number of repetitions is exceeded, the call is terminated in operation 426. Table 3 sets forth exemplary dialog that may be conveyed to the user in operations 420 and 422.

TABLE 3

"Before we go on, I need to know your name. Please say your full name now."
"Thanks. I heard <recorded name>. Did I get that right?"

Assuming that the user confirms their name, the user is requested to provide an affirmation of the name in operation 428. Such affirmation is then confirmed in operation 430. If the affirmation fails for some reason, operation 428 may be repeated for a predetermined number of repetitions, based on decision 432. If such predetermined number of repetitions is exceeded, the call is terminated in operation 426. Table 4 sets forth exemplary dialog that may be conveyed to the user in operations 428 and 430.

TABLE 4

"Now, please repeat after me: I solemnly certify that I am <recorded name>."
"Thanks. I heard <recorded affirmation>. Did I get that right?"

With reference now to FIG. 4B, the method 400 continues by providing a verbal introduction to the test. Note operation 440. See, for example, Table 5.

TABLE 5

"This test contains a series of questions. [The questions are divided into four sections." {This prompt is based on the number of sections in the test - omit if there's only one section}] "Listen to each question carefully and then tell me your answer. Remember to answer naturally, just like you'd talk to another person." <slight pause> "Are you ready to get started?"

If the user does not indicate that they're ready to get started, the call is terminated in operation 444. If they are ready, on the other hand, a section introduction dialog is verbally communicated to the user, as set forth in operation 442. See, for example, Table 6.

TABLE 6

{For first section} "First section."
{For last section} "Last section."
{Otherwise - xxx=second, third, etc.} "And now, here's the xxx section."
{Omit all section related prompts if there's only one section}
{Play section name audio} <slight pause> {Play section description audio} "And if you'd like to hear a question again, just say repeat." {Play this only if this section allows 'repeat'}
] "Here we go."
 - e.g. "Listening comprehension" <slight pause> "In this section, we'll measure your ability to listen and understand spoken English. Listen to each question and then pick the right answer from the four choices I'll give you. And if you'd like to hear a question again, just say repeat. Here we go."

The section dialog continues by verbally asking a question in operation 446. Table 7 sets forth an exemplary test question.

TABLE 7

{First time}
    {For first question} "First question."
    {For last question} "And now/Finally, the last question in this section."
    {Otherwise} "Next question."
{Repeat}
    {If 'repeat' is allowed} "Again." {Play question audio}
    {If 'repeat' is not allowed} "I'm sorry, but I can't repeat questions in this section. What's the caller's zipcode?"
{Play question audio}
 - e.g. "Listen to this clip of a caller saying her zip code. Well, you see, I moved two months ago, so my new zip code is 489 - oh wait - no that's 49931. What is the caller's zip code?"
{NSP/Nomatch} {Play appropriate error prompt} "What's the caller's zipcode?"
{Either record or recognize response depending on type of question}

If, after the question is verbalized, the user requests that it is repeated, the voice application may indicate the user's desire for the question to be repeated in operation 450. Thereafter, it may be determined whether a maximum number of repeats has been exceeded in operation 452. If not, the question is repeated in operation 446. If so, however, the method 400 continues with operation 454.

Once the user provides an utterance (or keypad/keyboard entry where appropriate) in response to the question, the voice application may confirm the same in operation 448. Table 8 sets forth an exemplary confirmation.

TABLE 8

{Play confirm audio} "You said: xxxxx. Did I get that right?"

In operation 454, it is determined whether more questions exist in the present section. If so, the method 400 continues with operation 446. If not, however, it is then determined whether there are any additional sections of questions, in decision 456. If not, the call is terminated in operation 462. If there are additional sections, however, a new section is introduced in operation 458.

The present embodiment thus allows callers to take a test or the like using only their voice. As an option, the test specification may employ various techniques for improving operation. Note Table 9.

TABLE 9

Linguistic Boundary Markers: Markers may be used to provide context for test takers, and thus prevent them from feeling lost. The dialog may provide clear linguistic markers between the different parts of the test. This may include clearly marked transitions between sections of the test and between the questions of each section.
Acknowledgements: When the caller provides a response, the voice application may acknowledge it by playing a prompt such as 'thanks'.
Appropriate Randomization: Where appropriate and possible, prompts may be randomized to provide a natural feel.
Limit Test Size: It may be tedious to callers to answer many questions on a call. Thus, efforts may be made to keep the number of questions to a minimum.

Further, various aspects of the present embodiment may optionally be configurable, per the specification. Note Table 10.

TABLE 10

The number of "no speech" events that a caller is allowed per question before the voice application skips to the next question. This is to prevent callers from getting stuck at a particular question. The actual number of "no speech" events may be reported at the end of the application and may be available to the grading logic, and factored into the final "grade."
The number of "repeats" a caller can ask for at a given question. If the caller asks for the question to be repeated more than this limit, the application may skip to the next question. The number of repeats may be available to the grading logic, and factored into the final "grade."
The no speech timeout for the application.
The maximum number of times a user may re-record an answer for a recording question.
The maximum number of times a user may negatively confirm an answer when they are asked to confirm their response.

An exemplary test specification will now be set forth in Appendix A, the format of which provides a flexible and extensible way for experts to create new specifications, etc. Of course, the user interface used to create such test specification, and related back-end architecture, reporting tools, etc. may be web-based.

APPENDIX A

Number of sections
Section 1
Number of questions in this section
Prompt name of the audio name for this section (e.g. "The listening comprehension section.")
Prompt name of the audio description for this section (e.g. "This section tests your ability to comprehend spoken American English.")
Question 1
Question id
Question type (i.e. whether this is a language query or an open-ended question)
Prompt name of the question audio
Prompt name of the question confirmation—e.g. "You said 95528. Is that right?"
Prompt name to use when the caller disconfirms the offered choice—e.g. "What was that zip code again?"
Grammar name for the answer grammar for the question
The token in the grammar for the correct answer
Textual representation of correct answer for display by an optional web tool
Question 2
See supra.
Section 2
See supra.

Thus, a technique is provided for administering a test utilizing speech recognition. In use, a file associated with a test is accessed (see, for example, the aforementioned specification). Utilizing such file, the test is administered over a phone. Results of the test are then received for scoring, grading, etc.

As an option, the file may include an XML file. Further, the XML file may be converted to a VoiceXML file upon being accessed. To this end, the results may be graded, and the graded results may be used to generate a scoring report. Optionally, the results may be graded according to a logic specified by the XML file. Further, the scoring report may be specified by the XML file.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for collecting information utilizing speech recognition, comprising:
   receiving a specification;
   configuring a voice application based on the specification;
   wherein the voice application is capable of collecting information utilizing speech recognition;
   wherein the voice application is tested by collecting information utilizing the voice application, the information including answers to multiple choice questions, and confidence scores associated with answers to language queries.

2. A method for collecting information utilizing speech recognition, comprising:
   receiving a specification;
   configuring a voice application based on the specification;
   wherein the voice application is capable of collecting information utilizing speech recognition;
   wherein the voice application is tested by collecting information utilizing the voice application, the information including confidence scores associated with answers to language queries, the voice application being calibrated by manually setting at least one threshold for the confidence scores.

3. A method for collecting information utilizing speech recognition, comprising:

generating a mark-up language specification, the specification including a plurality of multiple choice questions, a plurality of language queries, and a plurality of open-ended questions;

configuring a voice application based on the specification;

testing the voice application by collecting information utilizing the voice application, the information including answers to the multiple choice questions, confidence scores associated with answers to the language queries, and recorded speech content received in response to the open-ended questions;

calibrating the voice application based on the testing, the calibration including manually setting at least one threshold for the confidence scores;

wherein the calibrated voice application is capable of collecting information utilizing speech recognition and providing a grade based on the at least one threshold, the confidence scores, and the answers to the multiple choice questions.

* * * * *